United States Patent Office 3,278,534
Patented Oct. 11, 1966

3,278,534
NEW HYDROXYPHENYL-1,3,5-TRIAZINES
Max Schellenbaum, Riehen, Christian Luethi, Muenchenstein, and Max Duennenberger, Frenkendorf, Basel-Land, Switzerland, assignors to Ciba Limited, Basel, Switzerland, a company of Switzerland
No Drawing. Filed July 9, 1965, Ser. No. 470,875
Claims priority, application Switzerland, July 17, 1964, 9,423/64
10 Claims. (Cl. 260—249.5)

The present invention provides valuable new hydroxyphenyl-1,3,5-triazines which, like for instance the compound of the formula (1)

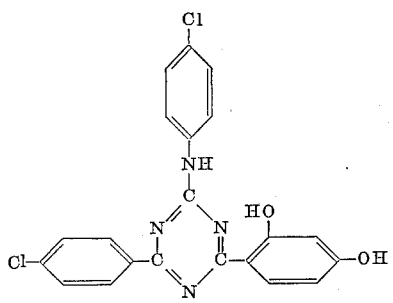

correspond to the general formula (2)

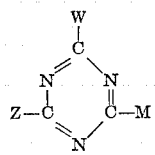

where W represents an amino group and M and Z each represents a benzene radical which is bound with the triazine ring through a cyclic carbon atom, and one of the two radicals M or Z contains a free and a possibly functionally modified hydroxyl group, the former being in ortho-position and the latter in para-position to the bond with the triazine ring.

The amino group W may be primary, tertiary or preferably secondary. Of the two radicals M and Z one, and only one, contains the two substituents referred to above, where as the other must not contain free hydroxyl groups and may contain as functionally modified hydroxyl group only an etherified or esterified hydroxyl group. In what follows the benzene radical containing the two hydroxyl groups is referred to by M and the other benzene radical by Z.

The compounds of the formula 2 are obtained by reacting a cyanuric halide with compounds of the benzene series that furnish the radicals M and Z and with a primary or secondary nitrogen base that furnishes the radical W:

(3)

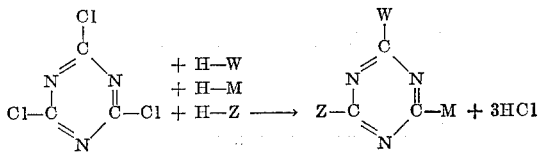

In the simplest case the nitrogen base used in ammonia, but it is also possible to use for the reaction with the halogenotriazine compound a wide variety of primary or secondary amines, for example those listed below:

(1) Primary amines.
(1.1) Aliphatic amines.
(1.1.1) Alkylamines containing 1 to 18 carbon atoms e.g. those which contain 1 to 8 or 10, 12, 16 or 18 carbon atoms, whose carbon chains may be branched, for example: monomethylamine, monoethylamine, mono-n-propylamine, isobutylamine, tertiary butylamine, n-dodecylamine or n-octadecylamine.
(1.1.2) Aralkylamines, preferably those which contain an aryl radical of the benzene series, such as benzylamine or β-phenylethylamine.
(1.1.3) Hydroxyalkylamines, such as ethanolamine or propanolamine.
(1.1.4) Alkoxyalkylamines, such as β-methoxyethylamine or β-ethoxyethylamine.
(1.1.5) Alkenylamines, such as allylamine.
(1.2) Aromatic amines, such as aniline or its nuclear substitution products, e.g.
(1.2.1) Halogen substitution products, such as 1-amino-2- or -4-chlorobenzene, 1-amino-2,4- or 3,4-dichlorobenzene, 1-amino-2,4,6-trichlorobenzene, the corresponding mono-, di- and tri-bromo compounds, 1-amino-2- or -4-iodobenzene or 1-amino-2-, -3- or -4-fluorobenzene.
(1.2.2) Trifluoromethyl compounds, such as 1-amino-3-trifluoromethylbenzene or 1 - amino-3,5-bistrifluoromethylbenzene.
(1.2.3) Nitro compounds, such as 1-amino-3- or -4-nitrobenzene.
(1.2.4) Alkyl compounds, such as 1-amino-2-, -3- or -4-methylbenzene, 1-amino-2,4- or -3,5-dimethylbenzene, 1-amino-2,6-diethylbenzene or 1-amino-2-methyl-5-isopropylbenzene.
(1.2.5) Alkoxy compounds, such as 1-amino-2-, -3- or -4-methoxybenzene, 1-amino-2,4- or -2,5-dimethoxybenzene, 1-amino-2,5-diethoxybenzene or 1-amino-4-butoxybenzene.
(1.2.6) Aminobenzenes containing a variety of the above substituents, e.g. 1-amino-2-methoxy-5-methylbenzene, 1 - amino-2-methyl-4-chlorobenzene, 1-amino-3-methyl-4-chlorobenzene or 1-amino-2-chloro-4-trifluoromethylbenzene.
(1.2.7) Aminobenzenes containing substituents other than those mentioned above, such as 1-amino-4-(4'-chlorophenoxy) - benzene, 1 - amino - 4,5-dichlorobenzene-2-sulphonic acid, 1-amino-4-hydroxy-3,5-dichlorobenzene or 1-amino-4-hydroxy-3,5-ditetrabutylbenzene.
(2) Secondary amines.
(2.1) N,N-dialkylamines e.g. those containing two of the radicals mentioned under 1.1.1 above, such as dimethylamine, diethylamine, methyl - n - butylamine, ethyl-n-butylamine, di-n-octylamine or di-n-dodecylamine.
(2.2) N,N-dihydroxyalkylamines, such as di-β-hydroxyethylamine or di-β- or di-γ-hydroxypropylamine.
(2.3) N,N-diaralkylamines, such as dibenzylamine.
(2.4) N,N-dialkyenylamines, such as diallylamine.
(2.5) N.N-diarylamines, such as diphenylamine, 2,4-dinitrodiphenylamine, phenyl-naphthyl - (1) - amine or phenyl-naphthyl-(2)-amine.

(2.6) N-aryl-N-alkylamines, such as methylphenylamine, ethylphenylamine, n-propylphenylamine, n-butylphenylamine, methyl-2-methylphenylamine, methyl-4-methylphenylamine or ethyl-4-methylphenylamine.

(2.7) Further secondary amines, such as methyl-methoxyamine ($H_3C-NH-OCH_3$), N-benzyl-N-(2'-methyl-phenyl)-amine or N-$\beta$-hydroxyethyl-N-(4-methylphenyl)-amine.

(2.8) Amines whose nitrogen atom is a member of a cycle, such as morpholine or piperazine.

In addition to the amino group W also the radical M must be introduced into the molecule of the Formula 2. For this purpose there are used 1,3-dihydroxybenzenes containing free or at most etherified but not otherwise functionally modified hydroxyl groups. It is of advantage not to etherify, esterify or convert the hydroxyl group in paraposition to the triazine ring into an urethane group until the last stage of the reaction has been reached, that is to say only after all halogen atoms of the triazine ring have been replaced.

Taking into consideration these reactions to be performed subsequently, the radial —M may, for example, correspond to the formula (4) 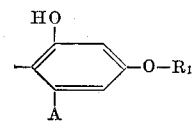

in which $R_1$ represents a hydrogen atom, an alkenyl radical, an unsubstituted or substituted alkyl group or a radical of the formula

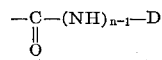

(where $n=1$ or 2 and D stands for an alkyl, cycloalkyl or benezene radical), and A represents a hydrogen atom or a radical —$OR_1$, where $R_1$ has the above meaning.

Alternatively, —M may represent a radical of the formula

5) 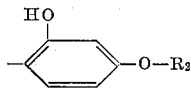

in which $R_2$ represents a hydrogen atom, an alkyl group containing up to 18 carbon atoms which may be substituted by a chlorine atom or by a hydroxyl, cyano, carboxyl, carbalkoxy or carbamyl group, such as an ethyl, dodecyl, or octadecyl group, $-CH_2-CH_2-CH_2-Cl$, $-CH_2-CH_2-OH$, $-CH_2-CH_2-CH_2-CH_2-OH$, $-CH_2-CH_2-CH_2-CN$, $-CH_2-COOH$, $-CH_2-(CH_2)_9-COOH$, $-CH_2-COOCH_3$, $-CH_2-CH_2-CH_2-COOC_2H_5$, $-CH_2-CONH_2$ and $-CH_2-(CH_2)_9-CONH_2$, an aralkyl or alkenyl group containing up to 9 carbon atoms, such as benzyl, para-chlorobenzyl, paramethylbenzyl, para-methoxybenzyl, phenylpropyl, $-CH_2-CO-C_6H_5$, allyl or crotyl, or a radical of the formula

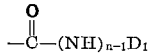

in which $n=1$ or 2, and $D_1$ represents an alkyl group containing up to 18 carbon atoms, such as ethyl, octyl or octadecyl or a phenyl group which may be substituted by an alkal or alkoxy group containing up to 8 carbon atoms, by a chlorine atom or by a phenyl or hydroxyl group, such as phenyl, para-chlorophenyl, paraphenylphenyl, ortho-hydroxyphenyl, para-methylphenyl, para-octylphenyl, para-tertiarybutoxyphenyl or para-methoxyphenyl.

A preferred radical M corresponds to the formula (7) 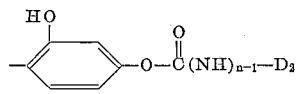

in which $n=1$ or 2, and $D_2$ represents an alkyl group containing up to 12 carbon atoms or a phenyl group which may be substituted by a chlorine atom or by a hydroxyl group.

Of special value is also a radical M of the formula (8) 

where $R_3$ represents a hydrogen atom, an alkyl group containing up to 12 carbon atoms, a hydroxyalkyl, cyanalkyl, carboxyalkyl, carbalkoxyalkyl or an alkenyl group containing up to 4 carbon atoms, or a benzyl group which may be substituted by a chlorine atom.

Finally, there are further required compounds capable of introducing the radical Z into the molecule of the triazine compound. For this purpose there are suitable compounds of the formula (9) 

in which U represents a hydrogen or halogen atom, an alkoxy group, an alkyl group or a benzene radical, and V represents a hydrogen or halogen atom or an alkyl group. Preferred halogen atoms are chlorine atoms, and the alkyl and alkoxy groups contain preferably no more than 8 carbon atoms. Thus, these benzene radicals may correspond especially to the formula

(10) 

where $U_2$ represents a hydrogen or chlorine atom, an alkyl or alkoxy group containing up to 4 carbon atoms or a phenyl group. As specific relevant examples there may be mentioned: benzene, diphenyl, methoxybenzene, methylbenzene, 1,3-dimethylbenzene and chlorobenzene.

As mentioned above a free hydroxyl group present in the radical M in para-position to the bond with the triazine ring in a compound of the Formula 2 can be converted into a functionally modified hydroxyl group.

Inter alia, these hydroxyl groups can, for example, be etherified. Particularly useful etherifying agents are e.g. ethylenechlorohydrin, n-allylbromide, n-bromooctane, n-bromooctadecane, benzylchloride, para-chlorobenzylchloride, crotylbromide, $\gamma$-bromobutyronitrile, chloracetic acid ethyl ester, $\gamma$-bromobutyric acid ethyl ester, 1-chloro-3-bromopropane, phenacylbromide, bromacetic acid methyl ester, bromacetic acid or bromopropionic acid amide, dimethylsulfate or diethylsulfate.

Isocyanates suitable for converting the hydroxyl groups into urethane groups are, inter alia: methylisocyanate, ethylisocyanate, n-butylisocyanate, dodecylisocyanate, octadecylisocyanate, cyclohexylisocyanate, phenylisocyanate, p-ethoxyphenylisocyanate, p-chlorphenylisocyanate, m-chlorophenylisocyanate, 3,4-dichlorophenylisocyanate, o-tolylisocyanate and p-tolylisocyanate.

For an optional conversion into esters there may be used acid halides or acid anhydrides, e.g. those of the following acids: acetic acid, butyric acid, stearic acid, benzoic acid, salicyclic acid, para-chlorobenzoic acid or para-tertiary butylbenzoic acid.

From what has been said above it will be realized that the new triazine compounds correspond, e.g. to the formula

(11)
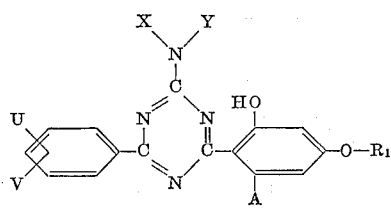

in which X and Y are identical or different; X represents a hydrogen atom, an alkenyl radical or an unsubstituted or substituted alkyl, phenyl or naphthyl radical; Y represents a hydrogen atom, an alkenyl radical or an unsubstituted or substituted alkyl radical (X and Y together with the nitrogen atom may also form a heterocycle), where $R_1$ represents a hydrogen atom, an alkenyl radical, an unsubstituted or substituted alkyl group or a radical of the formula

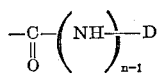

(where $n=1$ or 2 and D stands for an alkyl, cycloalkyl or benzene radical); A represents a hydrogen atom or a radical $-OR_1$ (where $R_1$ has the above meaning); U represents a hydrogen or halogen atom, an alkoxy group, an alkyl group or a benzene radical, and V represents a hydrogen or halogen atom or an alkyl group.

In this connection there are of special value the triazine compounds of the formula

(12)
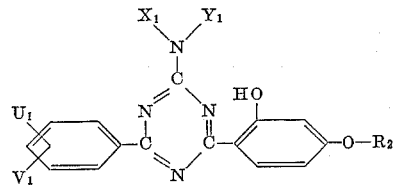

in which $X_1$ represents a hydrogen atom, a lower alkenyl group, an alkyl group containing up to 18 carbon atoms, a lower alkyl group substituted by a hydroxyl group, by a lower alkoxy group or a phenyl group, a naphthyl group or the group

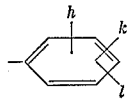

where $h$ represents a hydrogen or halogen atom, a lower alkyl, alkoxy or dialkylamino group, a phenyl, para-chlorophenoxy, trifluoromethyl, nitro, sulfonic acid group or a hydroxyl group which may be sterically hindered; $k$ represents a hydrogen atom, a halogen atom, a lower alkyl or alkoxy group or a trifluoromethyl or sulfonic acid group, and $l$ represents a hydrogen or halogen atom; $Y_1$ represents a hydrogen atom or an alkyl group containing up to 18 carbon atoms; $R_2$ represents a hydrogen atom or an alkyl group which contains up to 18 carbon atoms and may be substituted by a chlorine atom or by a hydroxyl, cyano, carboxyl, carbalkoxy or carbamyl group, an aralkyl or alkenyl group containing up to 9 carbon atoms, or a radical of the formula

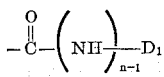

(where $n=1$ or 2 and $D_1$ represents an alkyl group containing up to 18 carbon atoms, or a phenyl group which may be substituted by a chlorine atom, by a phenyl or hydroxyl group or by an alkyl or alkoxy group containing up to 8 carbon atoms); $U_1$ represents a hydrogen or chlorine atom, an alkyl or alkoxy group containing up to 8 carbon atoms or a phenyl group, and $V_1$ represents a hydrogen or chlorine atom or an alkyl group containing up to 8 carbon atoms.

Depending on whether the above-mentioned substituent in the para-position of the benzene radical M is a free or etherified hydroxyl group, or an esterified hydroxyl group or a urethane radical, there may be obtained, for example, compounds of the formula

(13)
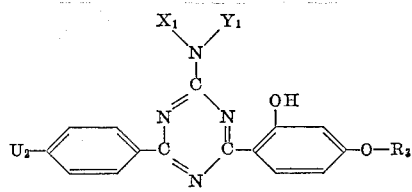

or

(14)
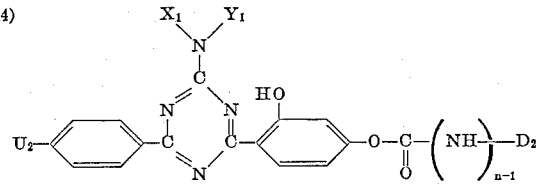

in which $X_1$ and $Y_1$ have the same meaning as in the Formula 12; $U_2$ represents a hydrogen or a chlorine atoms, a hydroxyalkyl, cyana-alkyl, carboxyalkyl, carbon atoms or a benzene radical; $R_3$ represents a hydrogen atom, an alkyl group containing up to 12 carbon atoms, a hydroxyalkyl, cyanaalkyl, carboxyalkyl, carbalkoxyalkyl or an alkenyl group containing up to 4 carbon atoms, or a benzyl group which may be substituted by a chlorine atom; $n=1$ or 2 and $D_2$ represents an alkyl group containing up to 12 carbon atoms, or a benzene radical which may be substituted by a chlorine atom or a hydroxyl group.

Particularly valuable relevant compounds are those of the formula

(15)
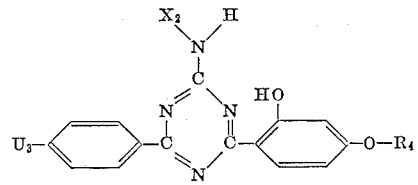

in which $X_2$ represents a hydrogen atom, an alkyl group containing 1 to 8 carbon atoms or a phenyl group which may be halogenated;

$U_3$ represents a hydrogen or chlorine atom or an alkyl group containing 1 to 4 carbon atoms, and $R_4$ represents a hydrogen atom, an alkyl group containing 1 to 18 carbon atoms, a benzyl group, a benzoyl group which may be alkylated, or an aliphatic acyl group containing 1 to 10 carbon atoms.

Specific examples of such valuable relevant compounds may be represented by the formula (16a)
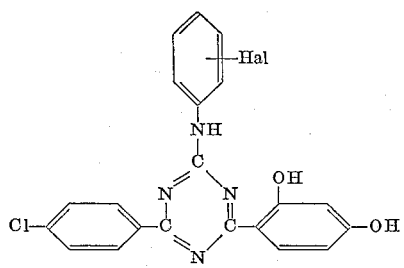

(16b)
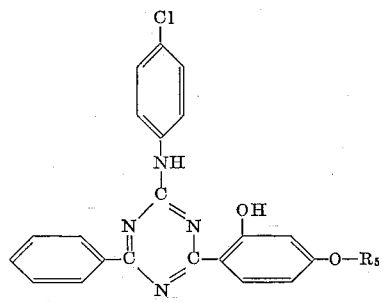

in which Hal represents a halogen atom such as chlorine or bromine, and $R_5$ stands for an alkyl group containing 1 to 18 carbon atoms.

For the manufacture of the triazine compounds of the Formula 2 according to the reaction diagram (3) a cyanuric halide is reacted in any desired sequence in the molecular ratio of 1:1 each with two benzene compounds of which one contains two hydroxyl groups or lower alkoxy groups in meta-position to each other, and with a primary or secondary nitrogen base and, if the benzene radical of the resulting compound contains in para-position to the bond with the triazine ring a free hydroxyl group, the latter is converted into a functionally modified hydroxyl group.

In general, it is advantageous to react in any desired sequence and always at the molecular ratio of 1:1 a compound of the formula

(17)
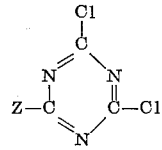

where Z represents a benzene radical which may be substituted by halogen atoms, alkyl or alkoxy group or by a further benzene radical—with a meta-dihydroxybenzene one of whose hydroxyl groups may be etherified with lower alkyl groups—and with a primary or secondary nitrogen base and, in the given case, a free hydroxyl group present in the benzene radical of the resulting compound in para-position to the bond with the triazine ring is etherified, esterified or converted into a urethane group.

According to an advantageous manufacturing process a dichlorotriazine of the Formula 17 is first condensed, preferably in an inert solvent and advantageously in the presence of an acid acceptor, with a primary or secondary nitrogen base, whereupon the resulting monochlorotriazine of the formula

(18)
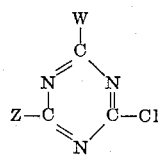

where Z has the above meaning and W represents an amino group, is reacted in an anhydrous medium and in the presence of a Friedel-Crafts catalyst, preferably aluminium chloride, and in an inert organic solvent, especially in nitrobenzene, with a compound of the benzene series that contains two hydroxyl groups in meta-position to each other whereupon, if desired, the resulting compound is etherified with a suitable halide, especially bromide, or with a dialkylsulfate, in an inert solvent in the presence of an acid acceptor, or is further reacted in the presence of an inert organic solvent and possibly of a tertiary amine with an isocyanate, acid halide or anhydride, in a manner such as to yield compounds of the above formulae containing functionally modified hydroxyl groups.

Suitable acid acceptors for the first reaction stage are e.g. alkali metal hydroxides such as sodium or potassium hydroxide, alkaline earth metal hydroxides such as calcium hydroxide, alkali metal carbonates such as sodium carbonate, or an excess of the nitrogen base used in the reaction. It is advantageous to perform the process in an organic solvent e.g. dioxane, in the presence or absence of water, at a moderately raised temperature e.g. at 40 to 70° C. Alternatively, the reaction of the dichlorotriazine of the Formula 17 with the amine may be performed at an elevated temperature without using an acid acceptor, in an organic solvent such as dichlorobenzene, with or without the addition of a Friedel-Crafts catalyst such as aluminium chloride. Such catalysts are also used for the second reaction, which is likewise advantageously conducted at a moderately raised temperature, e.g. at about 40° C.

When a different sequence is used, and a dichlorotriazine of the Formula 17 is first reacted with a compound of the benzene series that contains two hydroxyl groups in meta-position to each other, and the resulting monochlorotriazine of the formula

(19)
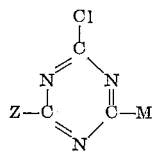

where Z has the above meaning and M is the radical of a 1,3-dihydroxybenzene which is bound in position 4 to the triazine ring, is condensed with a primary or secondary nitrogen base, these reactions may be carried out under similar conditions, namely the reaction with the dihydroxy compound, for instance, in nitrobenzene and in the presence of aluminium chloride, generally rather at a low temperature, e.g. at 0° C., and the reaction with nitrogen base also in this case e.g. with the aid of an acid acceptor.

According to a modified process the compounds of the Formula 2 can also be manufactured by reacting a primary or secondary nitrogen base upon a compound of the formula

(20)
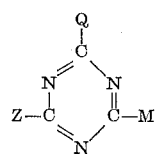

in which M and Z each represents a benzene radical bound with the triazine ring through a cyclic carbon atom, one of the radicals M and Z containing in ortho-position to the bond with the triazine ring a free hydroxyl group and in para-position to the said bond a hydroxyl group which may be functionally converted, and Q represents an alkoxy or aryloxy radical. This reaction may be promoted by so-called transesterification catalysts such as hydrochloric acid or sodium ethylate.

Any further desired reaction, such as etherification, esterification or conversion into an urethane, of the free reactive hydroxyl groups of the triazine compounds obtained by the processes just described can be carried out in the usual manner.

The new hydroxyphenyl-1,3,5-triazines of the above composition are suitable for use as stabilizers for a wide variety of organic materials.

Accordingly, the present invention includes also a process for protecting organic materials from the injurious effects of heat, air and ultraviolet rays, with the use of a new hydroxyphenyl-1,3,5-triazine of the Formula 2.

Quite generally, there are three different ways of using the new products, either separately or in combinations:

(A) The stabilizer is incorporated with a substrate to protect the latter, for example, from the attack by ultraviolet rays, so as to prevent a change in one or more physical properties, for example discoloration, impairment of the tensile strength, embrittlement and/or chemical reactions triggered off by ultraviolet rays, for example oxidation.

The incorporation may take place before or during the manufacture of the substrate or subsequently by a suitable operation, for example by a fixing operation similar to a dyeing process.

(B) The stabilizer is incorporated with a substrate in order to protect one or more other substances contained in the substrate, for example dyestuffs, assistants or the like. The protection of the substrate described under (A) above may be achieved at the same time.

(C) For use as light filter the stabilizer is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and ultraviolet rays consists in incorporating a new hydroxyphenyl-1,3,5-triazine of the Formula 2 with, or fixing on, the organic material to be protected itself or a substrate containing the said material or a filter layer placed on top of the material to be protected.

As examples of organic materials that can be protected there may be mentioned:

(a) Textile materials quite generally, which may be in any desired form e.g. in the form of fibres, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials accessible by polymerization or copolymerization, for example polyacrylonitrile, polyvinyl chloride or polyolefines such as polyethylene and polypropylene, or those which are accessible by polycondensation, such as polyesters and above all polyamides. In the case of semi-synthetic materials it is of advantage to incorporate the protective agent already with a spinning mass, for example a viscose spinning mass, acetylcellulose spinning mass (including cellulose triacetate) and masses destined for the manufacture of fully synthetic fibres, such as polyamide melts or polyacrylonitrile spinning masses, before, during or after the polycondensation or polymerization respectively.

(b) Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibres, such as paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polyacrylonitrile, polyesters and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine; as well as emulsions of synthetic resins (for example oil-in-water or water-in-oil emulsions). In this case it is of advantage to add the protective agent before or during the polymerization or polycondensation respectively. Furthermore, there may be mentioned synthetic resins reinforced with glass fibres and laminates made therefrom.

(f) Hydrophobic substances containing oil, fat or wax, such as candles, floor polishes, floor stains or other wood stains, furniture polishes, especially those destined for the treatment of light-colored, possibly bleached, wood surfaces.

(g) Natural rubber-like materials such as rubber, balata, gutta percha or synthetic, vulcanizable materials such as polychloroprene, olefinic polysulfides, polybutadiene or copolymers of butadiene+styrene (for example Buna S) or butadiene+acrylonitrile (for example Buna N) which may also contain fillers, pigments, vulcanization accelerators and the like, and in whose case the addittion of the hydroxyphenyl-1,3,5-triazines aims at delaying the ageing and thus at preventing changes in the plasticity properties and embrittlement.

(h) Cosmetic preparations such as perfumes, dyed or undyed soaps and bath salts, skin and face creams, powders, repellants and especially sunburn oils and creams.

It goes without saying that the hydroxyphenyl-1,3,5-triazines are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Depending on the kind of material to be treated, demands made on the efficiency and durability and other requirements, the amount of the stabilizer to be incorporated with the material to be treated may be varied within rather wide limits, for example from about 0.01 to 10%, preferably from 0.1 to 2%, of the weight of the material which is to be directly protected from the harmful effects of heat, air and ultraviolet rays.

Unless otherwise indicated, parts and percentages in the following examples are by weight. Melting points are uncorrected.

EXAMPLE 1

A solution of 9.3 parts of aniline in 100 parts of dioxane is added to a solution of 26.1 parts of 2-(4'-chlorophenyl)-

4,6-dichloro-1,3,5-triazine in 200 parts of dioxane and 20 parts of water. At 30° C. 55 parts of a 1.82 N-sodium hydroxide solution are dropped in at a rate such that the pH does not rise above 7. The reaction mixture is poured over 200 parts of ice-water and the precipitate suctioned off, washed with water and dried. Yield: about 31 parts of 2-(4'-chlorophenyl)-4-phenylamino-6-chloro-1,3,5-triazine. On recrystallization from aqueous dioxane and chloroform the product is obtained in colorless crystals and melts at 224 to 226° C.

$C_{15}H_{10}N_4Cl_2$ calculated: C, 56.80; H, 3.18; N, 17.66%. Found: C, 56.74; H, 3.25; N, 17.39%.

31.7 parts of 2-(4'-chlorophenyl)-4-phenylamino-6-chloro-1,3,5-triazine and 11.1 parts of 1,3-dihydroxybenzene are dissolved in 800 parts of nitrobenzene, and 26.8 parts of anhydrous aluminium chloride are added portionwise at 10° C. The batch is heated for 24 hours at 40° C. and then poured over 2000 parts of ice-water. The aqueous layer is isolated, the nitrobenzene solution washed twice with water, and the solvent is then removed by steam distillation. The product of the formula (21)

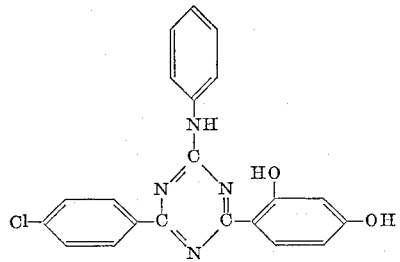

is obtained in a yield of about 37 parts and is recrystallized from dioxane+cyclohexane. The resulting faintly yellowish compound melts at 265 to 267° C.

$C_{21}H_{15}O_2N_4Cl$ calculated: C, 64.54; H, 3.87; N, 14.34%. Found: C, 64.24; H, 3.99; N, 14.21%.

EXAMPLE 2

260 parts of 2-(4'-chlorophenyl)-4,6-dichloro-1,3,5-triazine are dissolved at 50° C. in 4000 parts of nitrobenzene and 600 parts of tetrachloroethane; the solution is cooled to 0° C. and 126 parts of anhydrous aluminium chloride are added. A solution of 122 parts of 1,3-dihydroxybenzene in 700 parts of nitrobenzene is then stirred in dropwise at 0 to 3° C. The reaction mixture is stirred on for 16 hours at the same temperature, and the temperature is then allowed to rise to 25° C. The batch is then poured over 10,000 parts of ice-water, the aqueous layer is isolated and the nitrobenzene solution is washed twice with water. The solvent is expelled by steam distillation and the residue dried and extracted with benzene. The concentrated benzene extract is boiled with 2000 parts of cyclohexane, and the resulting suspension is filtered while still hot. The radical is once more recrystallized from dioxane+cyclohexane. The resulting purified 2-(4'-chlorophenyl)-4-(2'',4''-dihydroxyphenyl)-6-chloro-1,3,5-triazine melts at 224 to 225° C.

$C_{15}H_9O_2N_3Cl_2$ calculated: C, 53.92; H, 2.71; N, 12.58%. Found: C, 54.14; H, 3.10; N, 12.31%.

11.7 parts of 2-(4'-chlorophenyl)-4-(2'',4''-dihydroxyphenyl)-6-chloro-1,3,5-triazine in 100 parts of dioxane and 10 parts of water are mixed with 3.3 parts of aniline, and 19.3 parts of a 1.82 N-sodium hydroxide solution are dropped in at 65 to 70° C. at a rate such that the pH does not rise above 7. When all hydroxide has been added, the reaction product is poured over 500 parts of ice-water and the resulting precipitate is suctioned off, washed with water and dried, to give an approximately quantitative yield of the 2-(4'-chlorophenyl)-4-(2'',4''-dihydroxyphenyl)-6-phenylamino-1,3,5-triazine of the Formula 21 described in Example 1. It can be purified by another recrystallization from dioxane+cyclohexane.

EXAMPLE 3

20.0 parts of 2-(4'-chlorophenyl)-4-(2'',4''-dihydroxyphenyl)-6-chloro-1,3,5-triazine, 15.1 parts of 2,4-dibromoaniline and 8.8 parts of anhydrous aluminium chloride are dissolved with stirring at 80° C. in 400 parts of dichlorobenzene. The solution is then heated to 95 to 100° C., at which temperature a strong evolution of hydrogen chloride sets in. The batch is then stirred on for 16 hours at 100° C., poured over ice-water, the aqueous phase is isolated and the dichlorobenzene layer is washed twice with water. The dichlorobenzene is removed by steam distillation and the residue is suctioned off and dried, to yield about 31 parts of the compound of the formula (22)

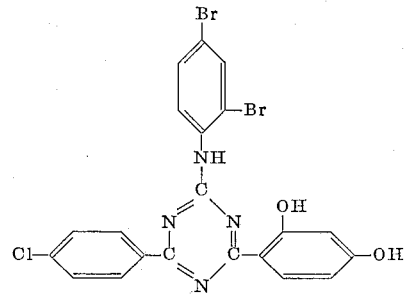

The pale-yellow compound obtained by recrystallization from dioxane+cyclohexane melts at 314 to 316° C.

$C_{21}H_{13}O_2N_4ClBr_2$ calculated: C, 45.97; H, 2.39; N, 10.21%. Found: C, 46.31; H, 2.49; N, 9.99%.

EXAMPLE 4

10.0 parts of 2-(4'-chlorophenyl)-4-(2'',4''-dihydroxyphenyl)-6-chloro-1,3,5-triazine and 3.9 parts of 4-chloraniline in 400 parts of dichlorobenzene are heated with stirring for 16 hours at 130° C. The reaction mixture is worked up as described in Example 3, to yield about 12 parts of the product of the formula (23)

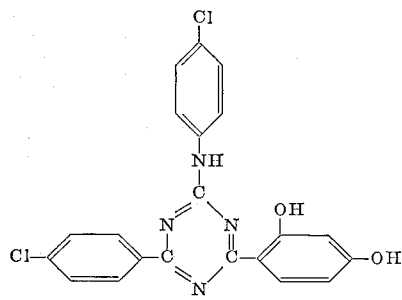

The light-yellow compound obtained by recrystallization from dioxane+cyclohexane melts at 297 to 299° C.

$C_{21}H_{14}O_2N_4Cl_2$ calculated: C, 59.31; H, 3.32; N, 13.17%. Found: C, 59.12; H, 3.34; N, 13.25%.

The following compounds of the formula (24)

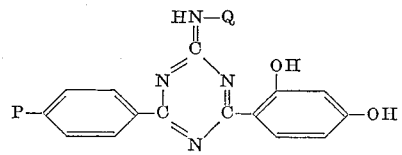

TABLE I

| No. | Q | P | Melting point, °C. | C calc. / C found | H calc. / H found | N calc. / N found |
|---|---|---|---|---|---|---|
| 25 | 2,4-dichlorophenyl | —Cl | 293 to 295 | 54.87 / 55.10 $C_{21}H_{13}O_2N_4Cl_3$ | 2.85 / 3.09 | 12.19 / 12.14 |
| 26 | 3,4-dichlorophenyl | —Cl | 316 to 318 | 54.87 / 55.15 $C_{21}H_{13}O_2N_4Cl_3$ | 2.85 / 3.07 | 12.19 / 12.45 |
| 27 | 2,4,5-trichlorophenyl | —Cl | 319 to 332 | 51.04 / 51.23 $C_{21}H_{12}O_2N_4Cl_4$ | 2.45 / 2.77 | 11.34 / 11.19 |
| 28 | 4-bromophenyl | —Cl | 305 to 307 | 53.70 / 53.58 $C_{21}H_{14}O_2N_4ClBr$ | 3.00 / 3.33 | 11.93 / 11.72 |
| 29 | 4-fluorophenyl | —Cl | 295 to 297 | 61.70 / 61.71 $C_{21}H_{14}O_2N_4ClF$ | 3.45 / 3.66 | 13.70 / 13.53 |
| 30 | 4-nitrophenyl | —Cl | 350 to 353 | 57.87 / 57.99 $C_{21}H_{14}O_4N_5Cl$ | 3.24 / 3.44 | 16.07 / 15.81 |
| 31 | 3-CF₃-4-CH₃-phenyl | —Cl | 246 to 248 | 52.44 / 52.39 $C_{23}H_{13}O_2N_4ClF_6$ | 2.43 / 2.59 | 10.64 / 10.68 |
| 32 | 3-Cl-4-OCH₃-2-OCH₃-phenyl | —Cl | 255 to 257 | 56.92 / 56.54 $C_{23}H_{18}O_4N_4Cl_2$ | 3.74 / 4.09 | 11.54 / 11.65 |
| 33 | —(CH₂)₃—CH₃ | —Cl | 192 to 193 | 61.54 / 61.30 | 5.16 / 5.38 | 15.11 / 15.46 |
| 34 | 4-chlorophenyl | —H | 274 to 277 | 64.54 / 64.34 | 3.87 / 3.75 | 14.34 / 14.45 |
| 35 | —H | —H | 273.5 to 275 | 62.9+ / 62.9 | 4.5+ / 4.5 | 19.6+ / 19.7 |
| 36 | phenyl | —H | 266 to 227 | 70.77 / 70.78 | 4.53 / 4.77 | 15.72 / 15.66 |
| 37 | —H | —Cl | 300 to 302 | 57.24 / 56.95 $C_{15}H_{11}N_4O_2Cl$ | 3.52 / 3.91 | 17.81 / 17.62 |
| 38 | —CH₃ | —Cl | 248 to 249 | 58.45 / 58.28 $C_{16}H_{13}O_2N_4Cl$ | 3.99 / 3.97 | 17.04 / 17.05 | can be manufactured by one of the methods described above, in which formula P and Q have the meanings shown in the above Table I. (The symbol + in the table indicates "containing ⅓ mol of water of crystallization.")

EXAMPLE 5

23.5 parts of the compound of the Formula 34, 3.4 parts of potassium hydroxide, 11 parts of anhydrous potassium carbonate are mixed with 80 parts of water and dissolved in 250 parts of acetone. In the course of 30 minutes at 30 to 35° C. 10.1 parts of diethylsulfate in 40 parts of acetone are then dropped in the batch is heated for 4 hours at 35° C. and refluxed for 2 hours, allowed to cool in ice, and the precipitate is suctioned off. washed with a small amount of alcohol and copiously with water, and dried, to yield about 22.5 parts of the compound of the formula (39)

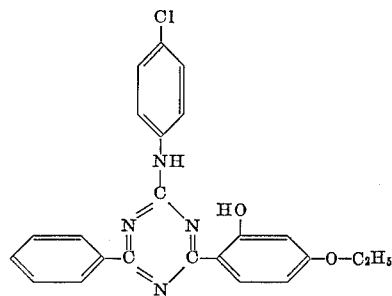

which, after recrystallization from benzene+alcohol, melts at 196 to 197° C. and reveals the following analytical data:

$C_{23}H_{19}O_2N_4Cl$ calculated: C, 65.95; H, 4.57; N, 13.38%. Found: C, 65.99; H, 4.79; N, 13.26%.

By replacing diethylsulfate by dimethylsulfate and proceeding otherwise in an identical manner, the corresponding para-methyl ether (40) $C_{22}H_{17}O_2N_4Cl$ is obtained.

EXAMPLE 6

23.5 parts of the compound of the Formula 34 and 3.4 parts of potassium hydroxide are dissolved at 30° C. in 100 parts of glycol monomethyl ether, and 9 parts of n-butylbromide are then added. The batch is stirred for 2 hours at 30° C., then for 2 hours at 40° C. and finally overnight at 50° C., cooled in ice and suctioned off.

The precipitate (18 parts) is washed with alcohol and water and dried at 70° C.; it corresponds to the formula

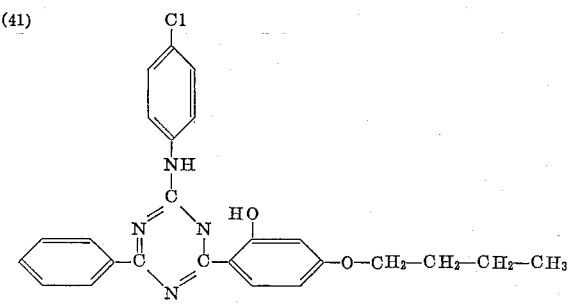

and after recrystallization from benzene+alcohol it melts at 166 to 168° C.

$C_{25}H_{23}O_2N_4Cl$ calculated: C, 67.18; H, 5.19; N, 12.54%. Found: C, 67.07; H, 5.26; N, 12.37%.

In a similar manner, using benzylbromide, the ether of the formula

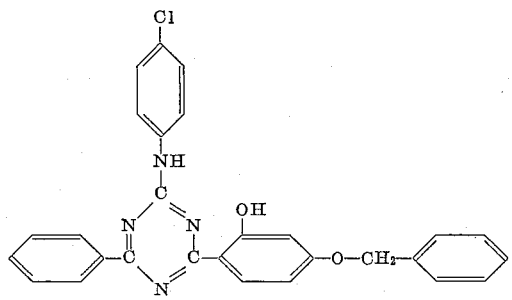

is obtained in a similar yield and purity. It melts at 197 to 198° C.

$C_{28}H_{21}O_2N_4Cl$ calculated: C, 69.93; H, 4.40; N, 11.65%. Found: C, 69.75; H, 4.33; N, 11.63%.

Working in a manner similar to that described above and using 2-phenyl-4-amino-6-[2',4' - dihydroxyphenyl]-1,3,5-triazine (see Table I, No. 35) the compound of the formula

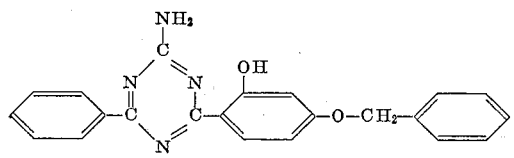

melting at 181 to 182° C. is obtained in a similar yield and purity.

$C_{22}H_{18}O_2N_4$ calculated: C, 71.33; H, 4.90; N, 15.13%. Found: C, 71.27; H, 5.00; N, 15.41%.

EXAMPLE 7

A mixture of 7.5 parts of the compound of the Formula 34, 3.5 parts of butyric anhydride and 60 parts of chlorobenzene is heated for 2 hours at 110° C., then for 4 hours at 120° C. and then refluxed for 16 hours. The resulting solution is clarified with alumina, filtered and concentrated to 25 parts. On addition of 50 parts of alcohol, 6.4 parts of substantially pure compound of the formula (44)

crystallize out. After one recrystallization from methylenechloride+alcohol the product melts at 146 to 147° C., then solidifies again and melts a second time at 164 to 165° C.

$C_{25}H_{21}O_3N_4Cl$ calculated: C, 65.15; H, 4.59; N, 12.16%. Found: C, 64.98; H, 4.58; N, 12.12%.

EXAMPLE 8

9.3 parts of the compound of the Formula 33 are dissolved in 120 parts of acetone and 25 parts of pyridine, and 3.9 parts of benzoyl chloride are added. The batch is stirred for 6 hours each at 20° C., 45° C. and under reflux, poured into about 400 parts of water, and the precipitate is allowed to solidify and then suctioned off and thoroughly washed with water and dried, to yield 10.8 parts of the compound of the formula (45)

which after one recrystallization from benzene+alcohol melts at 170 to 171° C. and reveals the following analytical data:

$C_{26}H_{23}O_3N_4Cl$ calculated: C, 65.75; H, 4.88; N, 11.80%. Found: C, 65.43; H, 4.89; N, 12.08%.

In the manner described in Examples 5, 6, 7 or 8 the compounds of the formula (46)

where $P_1$ and $Q_1$ have the meanings shown in the following Table II are obtained:

TABLE II

| No. | $Q_1$ | $P_1$ | Melting point, °C | C calc. / C found | H calc. / H found | N calc. / N found |
|---|---|---|---|---|---|---|
| 47 | —H | —$C_2H_5$ | 250 to 251 | 59.57 / 59.65 | 4.41 / 4.52 $C_{17}H_{15}O_2N_4Cl$ | 16.34 / 16.42 |
| 48 | —$CH_2CH_2$— / —$CH_2CH_3$ | —$CH_3$ | 141 to 143 | 62.40 / 62.41 | 5.51 / 5.52 $C_{20}H_{21}O_2N_4Cl$ | 14.55 / 14.72 |
| 49 | —$CH_2CH_2$— / —$CH_2CH_3$ | —$C_2H_5$ | 152.5 to 153 | 63.23 / 63.36 | 5.81 / 5.69 $C_{21}H_{23}N_4O_2Cl$ | 14.05 / 14.11 |
| 50 | —$CH_2CH_2$— / —$CH_2$—$CH_3$ | —$CH_2$— —$(CH_2)_{16}$—$CH_3$ | 93 to 94.5 | 71.30 / 71.55 | 8.89 / 9.13 $C_{37}H_{55}O_2N_4Cl$ | 8.99 / 9.18 |
| 51 | —$CH_2$—$CH_2$— / —$CH_2$—$CH_3$ | $\overset{O}{\overset{\|}{-C}}$—$CH_3$ | 133 to 134 | 61.09 / 60.97 | 5.13 / 5.03 $C_{21}H_{21}O_3N_4Cl$ | 13.57 / 13.55 |
| 52 | —$CH_2$—$CH_2$— / —$CH_2CH_3$ | $\overset{O}{\overset{\|}{-C}}$—$(CH_2)_{10}$— —$CH_3$ | 88 to 89.5 | 67.31 / 66.99 | 7.47 / 7.50 $C_{31}H_{41}O_3N_4Cl$ | 10.13 / 10.05 |
| 53 | —$CH_2CH_2$— / —$CH_2CH_3$ | $\overset{O}{\overset{\|}{-C}}$—⟨phenyl⟩—$C(CH_3)_3$ | 172 to 174 | 67.85 / 67.67 | 5.88 / 5.76 $C_{30}H_{31}O_3N_4Cl$ | 10.55 / 10.73 |

EXAMPLE 9

When in Example 1 the 2-(4'-chlorophenyl)-4,6-dichloro-1,3,5-triazine is replaced by 2-(4'-methylphenyl)-4,6-dichloro-1,3,5-triazine and this compound is reacted under conditions similar to those of Example 1 with n-octylamine, and the resulting 2-(4'-methylphenyl)-4-n-octylamino-6-chloro-1,3,5-triazine is reacted with 1,3-dihydroxybenzene, the compound of the formula (54)

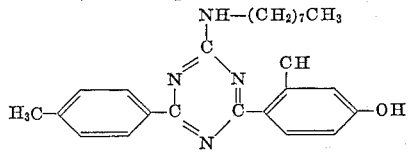

is obtained in a substantially identical yield and purity. After recrystallization from methylenechloride+cyclohexane the compound melts at 118 to 119° C.

$C_{24}H_{30}O_2N_4$ calculated: C, 70.91; H, 7.44; N, 13.78%. Found: C, 70.94; H, 7.38; N, 13.78%.

In the following examples, which describe possibilities of use, a typical representative is used in each case. Quite generally, all compounds mentioned in the foregoing description are suitable in a similar manner, but in each case the solubility of the compound concerned in the substrate to be used must be taken into consideration.

EXAMPLE 10

A film about 60μ thick is prepared from a 10% acetonic solution of acetyl cellulose, contains 1% of the compound of the Formula 34 or 35. After drying, the following values of the light transmission in percent are obtained:

| Wavelength in mμ | Light transmission in percent | |
|---|---|---|
| | Unexposed film | Film exposed for 100 hours in a fadeometer |
| 280 to 350 | 0 | 0 |
| 360 | 9 | 8 |
| 370 | 39 | 39 |
| 380 | 69 | 69 |
| 390 | 84 | 86 |

EXAMPLE 11

A paste from 100 parts of polyvinylchloride, 59 parts by volume of dioctyl phthalate and 0.2 part of the compound of the Formula 34 is rolled on a calender at 145 to 150° C. to form a film about 0.5 mm. thick. The polyvinylchloride film produced in this manner absorbs completely in the ultraviolet region from 280 to 350 mμ.

EXAMPLE 12

A mixture of 100 parts of polyethylene and 0.2 part of one of the compounds of the Formula 34 is converted on a calender at 130 to 140° C. into a film which is then pressed at 150° C.

The resulting polyethylene film is substantially impermeable to ultraviolet light within the region from 280 to 360 mμ.

EXAMPLE 13

A mixture of 100 parts of polypropylene and 0.2 part of the compound of the Formula 34 is converted into a sheet on a calender at 170° C., and the sheet is then pressed at 230 to 240° C. under a maximum pressure of 40 kg. per cm.² to form a panel 1 mm. thick.

The resulting panel is impermeable to ultraviolet light in the region from 280 to 360 mμ.

EXAMPLE 14

0.2 part of the compound of the Formula 34 is dissolved in 1.8 parts of monostyrene and a solution of cobalt naphthenate in monostyrene (containing 1% of cobalt) is added. There are then added 40 parts of a solution in monostyrene of an unsaturated polyester resin based on phthalic acid-maleic acid-ethyleneglycol and the mixture is stirred for 10 minutes. 1.7 parts of a catalyst solution (methylethylketone peroxide in dimethyl phthalate) are then dropped in and the mixture is thoroughly stirred to expel all air from it and poured in between two panes of glass. After about 20 minutes the polyester panel (1 mm. thick) has solidified sufficiently to enable it to be removed from the glass mould. It is impermeable to ultraviolet light in the region from 280 to 360 mμ and shows no sign of embrittlement after 1000 hours' irradiation in the Xeno test.

What is claimed is:

1. Hydroxyphenyl-1,3,5-triazines of the formula

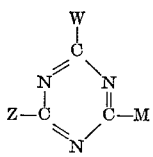

where W represents an amino group and M and Z each a benzene residue which is bound with the triazine ring through a cyclic carbon atom, one of the two residues M and Z containing a free hydroxyl group and a hydroxyl group which may be functionally modified, the former being in ortho-position and the latter in para-position to the bond with the triazine ring.

2. Hydroxyphenyl-1,3,5-triazines of the formula

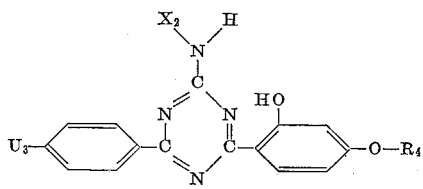

where $X_2$ represents a member selected from the group consisting of a hydrogen atom, an alkyl group containing 1 to 8 carbon atoms and a phenyl group which may be halogenated; $U_3$ represents a member selected from the group consisting of a hydrogen or chlorine atom and an alkyl group containing 1 to 4 carbon atoms, and $R_4$ represents a member selected from the group consisting of hydrogen atom, an alkyl group containing 1 to 18 carbon atoms, a benzyl group, a benzoyl group which may be alkylated, and an aliphatic acyl group containing 1 to 10 carbon atoms.

3. Hydroxyphenyl-1,3,5-triazines of the formula

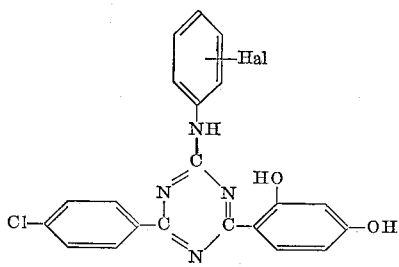

where Hal represents a chlorine or bromine atom.

4. Hydroxyphenyl-1,3,5-triazines of the formula

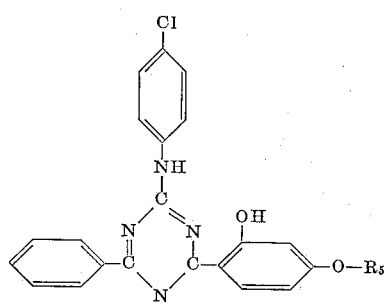

where $R_5$ represents an alkyl group containing 1 to 18 carbon atoms.

5. The hydroxyphenyl-1,3,5-triazine of the formula

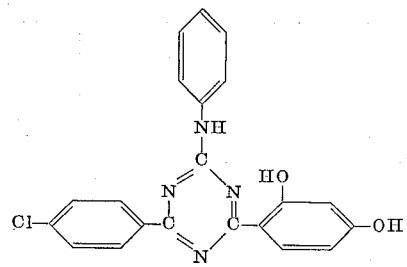

6. The hydroxyphenyl-1,3,5-triazine of the formula

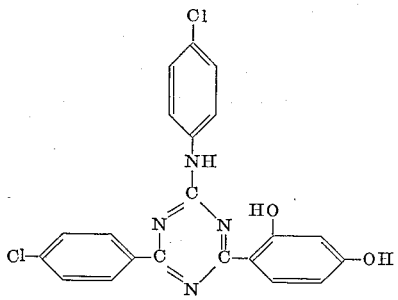

7. The hydroxyphenyl-1,3,5-triazine of the formula

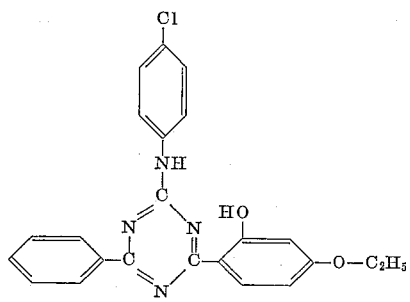

8. The hydroxyphenyl-1,3,5-triazine of the formula

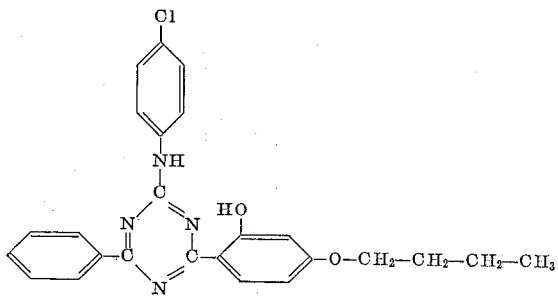

9. The hydroxyphenyl-1,3,5-triazine of the formula

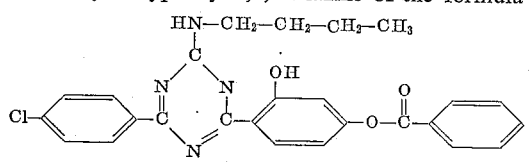

10. The hydroxyphenyl-1,3,5-triazine of the formula

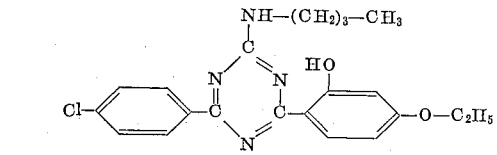

No references cited.

WALTER A. MODANCE, *Primary Examiner.*

JOHN M. FORD, *Assistant Examiner.*

Notice of Adverse Decision in Interference

In Interference No. 97,119 involving Patent No. 3,278,534, M. Schellenbaum, C. Luethi and M. Duennenberger, NEW HYDROXYPHENYL-1,3,5-TRIAZINES, final judgment adverse to the patentees was rendered Feb. 11, 1972, as to claims 1 and 2.

[*Official Gazette July 4, 1972.*]

Disclaimer 3,278,534.—*Max Schellenbaum*, Riehen, *Christian Luethi*, Muenchenstein, and *Max Duennenberger*, Frenkendorf, Basel-Land, Switzerland. NEW HYDROXYPHENYL-1,3,5-TRIAZINES. Patent dated Oct. 11, 1966. Disclaimer filed Apr. 11, 1972, by the inventors, and the assignee, *Ciba-Geigy AG*, assenting.

Hereby enters this disclaimer to claims 1 and 2 of said patent.

[*Official Gazette December 26, 1972.*]